United States Patent [19]

Nakhamkin

[11] Patent Number: 5,386,688
[45] Date of Patent: Feb. 7, 1995

[54] METHOD OF GENERATING POWER WITH HIGH EFFICIENCY MULTI-SHAFT REHEAT TURBINE WITH INTERCCOOLING AND RECUPERATION

[75] Inventor: Michael Nakhamkin, Mountainside, N.J.

[73] Assignee: Cascaded Advanced Turbine Limited Partnership, Mountainside, N.J.

[21] Appl. No.: 242,081

[22] Filed: May 12, 1994

Related U.S. Application Data

[63] Continuation-in-part of Ser. No. 52,948, Apr. 23, 1993, Pat. No. 5,347,806.

[51] Int. Cl.$^6$ ................................................ F02C 3/04
[52] U.S. Cl. .............................. 60/39.04; 60/39.161; 60/39.17
[58] Field of Search ............... 60/39.04, 39.07, 39.161, 60/39.163, 39.17, 39.182, 39.183, 39.511, 39.512, 39.53, 728

[56] References Cited

U.S. PATENT DOCUMENTS

| | | |
|---|---|---|
| 2,115,338 | 4/1938 | Lysholm . |
| 2,186,706 | 1/1940 | Martinka . |
| 2,482,791 | 9/1949 | Nettel et al. . |
| 2,567,581 | 9/1951 | Salter . |
| 2,584,232 | 2/1952 | Sedille ................................ 60/39.17 |
| 2,602,289 | 7/1952 | Anxionnaz et al. . |

(List continued on next page.)

FOREIGN PATENT DOCUMENTS

| | | | |
|---|---|---|---|
| 286978 | 11/1952 | Switzerland . | |
| 749263 | 5/1956 | United Kingdom | 60/39.511 |

OTHER PUBLICATIONS

G. R. Barr et al "Turbomachinery Development and Solar's Product Line Evolution"–Turbomachinery Technology Seminar (1989).

L. F. Giannuzzi et al "Optimization of Gas Turbine Cycles with Variable Number of Combustion, Compressor, and Inter–cooler Stages" ASME 81–JPGC–G–T–6 (1981).

Wiley, John "Aircraft and Missile Propulsion", The Gas Turbine Power Plant, the Turboprop, Turbojet, Ramjet, and Rocket Engines, vol. II, pp. 24–26.

Primary Examiner—Louis J. Casaregola
Attorney, Agent, or Firm—Cushman, Darby & Cushman

[57] ABSTRACT

A method providing electric power with a system including a generator, and a single power shaft assembly having a compressor, turbine, combustor feeding the turbine, and drive coupling between the turbine, compressor, and generator. The method includes providing at least one additional shaft assembly including at least one combination of an intercooler feeding a compressor, at least one combination of a combustor feeding a turbine, and a drive coupling between at least one turbine of the at least one additional shaft assembly and at least one compressor of the at least one additional shaft assembly; providing a recuperator; connecting the power shaft assembly, the at least one additional shaft assembly, and the recuperator to define a thermal cycle with an air and gas path through the compressor of the power shaft assembly, the intercooler and compressor of the at least one additional shaft assembly, recuperator, combustor and turbine of the at least one additional shaft assembly, and the combustor and turbine of the power shaft assembly; ensuring that a total pressure ratio of all compressors of the at least one additional shaft assembly is greater than a total expansion ratio of all turbines of the at least one additional shaft assembly; and ensuring that the compressor of the power shaft assembly has a pressure ratio lower than an expansion ratio of the turbine of the power shaft assembly, thereby pressure unloading the compressor of the power shaft assembly so the turbine of that assembly supplies more power to the generator.

14 Claims, 5 Drawing Sheets

U.S. PATENT DOCUMENTS

| | | |
|---|---|---|
| 2,625,012 | 1/1953 | Larreco . |
| 2,626,502 | 1/1953 | Lagelbauer . |
| 2,633,707 | 4/1953 | Hermitte et al. ............ 60/39.17 |
| 2,655,364 | 10/1953 | Maldague . |
| 2,758,827 | 8/1956 | Pfenninger ............. 60/39.511 |
| 2,869,324 | 1/1959 | Foote . |
| 3,048,018 | 8/1962 | Nicolin . |
| 3,325,992 | 6/1967 | Sheldon . |
| 3,335,565 | 8/1967 | Aguet . |
| 3,379,009 | 4/1968 | Sharp et al. . |
| 3,461,667 | 8/1969 | Aguet . |
| 3,657,879 | 4/1972 | Ewbank et al. . |
| 3,731,485 | 5/1973 | Rudolph et al. . |
| 3,877,218 | 4/1975 | Nebgen . |
| 3,962,864 | 6/1976 | Williams et al. . |
| 4,368,616 | 1/1983 | Abo et al. . |
| 4,418,527 | 12/1983 | Schlom et al. . |
| 4,448,018 | 5/1984 | Sayama et al. . |
| 4,537,023 | 8/1985 | Nakamura et al. . |
| 4,829,763 | 5/1989 | Rao . |
| 4,896,499 | 1/1990 | Rice . |
| 5,105,617 | 4/1992 | Malohn ............. 60/39.511 |

METHOD OF GENERATING POWER WITH HIGH EFFICIENCY MULTI-SHAFT REHEAT TURBINE WITH INTERCCOOLING AND RECUPERATION

This application is a continuation-in part of my U.S. application Ser. No. 08/052,948, filed Apr. 23, 1993 (U.S. Pat. No. 5,347,806).

BACKGROUND OF THE INVENTION

1. Field of the Invention

This invention relates to combustion turbine engines with intercooling, recuperation, reheat, saturation, heat recovery steam generation.

2. Background Information

A typical and currently available simple cycle combustion turbine consists of a compressor for compressing the atmospheric air, a combustor for heating the compressed air, a turbine for power production and an electric generator for converting mechanical energy into electrical energy. A more sophisticated combustion turbine concept with a number of compressors with intercoolers and with a number of turbines with associated combustors and, also, with a recuperator, has been theoretically known at least since the 1920's.

Major features of the conventional, generic, sophisticated combustion turbine concept as disclosed in the article entitled "Optimization of Gas Turbine Cycles with Variable Number of Combustion, Compressor and Intercooler Stages", document no. 81-JPGC-CT-6 published in 1981 by the American Society of Mechanical Engineers, are as follows:

- The highest pressure turbine with associated combustor has the highest inlet temperature. The lower pressure turbines with associated combustors have the same (as the highest pressure turbine) inlet temperature;
- The expansion pressure ratios of all turbines theoretically shall be equal; and
- The compression pressure ratios of all compressors theoretically shall be equal. Earlier patents, for example, U.S. Pat. No. 2,584,232 to Sedille utilize this generic theoretical combustion turbine cycle with the aforementioned features. The major thrust of these patents is the utilization of available and otherwise wasted heat resources of the generic theoretical combustion turbine concept for improving the resulting power plant efficiency. These heat resources are used for steam generation and additional electric power production by the bottoming steam turbine or via steam injection.

No current practical applications of this prior art theoretical sophisticated combustion turbine cycle have been established, due to a number of engineering problems facing the power plant designers.

The first and the most important engineering problem is that the highest pressure turbine for the prior art combustion turbine concept has the highest inlet temperature. This presents a serious challenge because of high thermal and transient stresses in the high pressure and temperature turbine components, and requires special materials and engineering yet to be developed.

The second engineering problem is a result of the fact that for a typical prior art concept a plurality of combustion turbines with the same inlet temperatures and equal pressure ratios have very high exhaust gas flow temperatures which are the inlet temperatures for a plurality of downstream combustors. This is yet another serious engineering challenge.

OBJECTS OF THE INVENTION

An object of this invention is to develop a method of efficiently generating electric power using a new combustion turbine with improved efficiency and economics which embodies a properly integrated plurality of turbines with reheat, a plurality of compressors with intercoolers, a recuperator, saturator, water heaters, duct burners, and a heat recovery steam generator.

Another object of this invention is to provide a method of reducing inlet temperatures (to the current level of temperatures for industrial expanders) to a plurality of turbines which have inlet pressures exceeding the level of the conventional inlet turbine pressure for simple cycle combustion turbines. This resolves the first and the most important engineering problem: a prohibitive combination of coincidental high pressures and temperatures.

Still another object of this invention is to provide a method of reducing the gas flow temperatures entering a plurality of combustors. This resolves the second engineering problem.

Yet another object of this invention is to provide a method of integrating a saturator in the combustion turbine concept to improve the combustion turbine thermal efficiency and to increase the specific production of electric power per pound of air. The saturator, via heat and mass exchange, preheats the compressed air and saturates it with moisture before entering a recuperator and expansion turbines.

Another object of the invention is to provide a method to incorporate a recuperator and water heaters into the inventive combustion turbine concept for better utilization of the combustion turbine cycle available heat with associated improvement of the thermal efficiency.

Still another object of the invention is to provide a method to maximum utilization of the available prior art simple cycle combustion turbine components with the addition of currently available industrial components properly integrated into the inventive cycle in order to facilitate practical implementation of the inventive concept.

Yet a further object of this invention is to provide a method to utilize a heat recovery steam generator for the alternative utilization of the exhaust gas heat, for steam use in the bottoming cycle and/or for steam injection into one of the plurality of turbines.

A further object of the invention is to provide a method to use duct burners strategically positioned in locations of the system to improve the efficiency and economics of the system further.

A still further object of the invention is to provide a method to use a chemical recuperator/reformer in combination with a heat recovery steam generator; a mixture of the reformed fuel and steam is used in the combustors so as to improve the system efficiency and to significantly reduce pollutant emissions.

SUMMARY OF THE INVENTION

Figure 1:
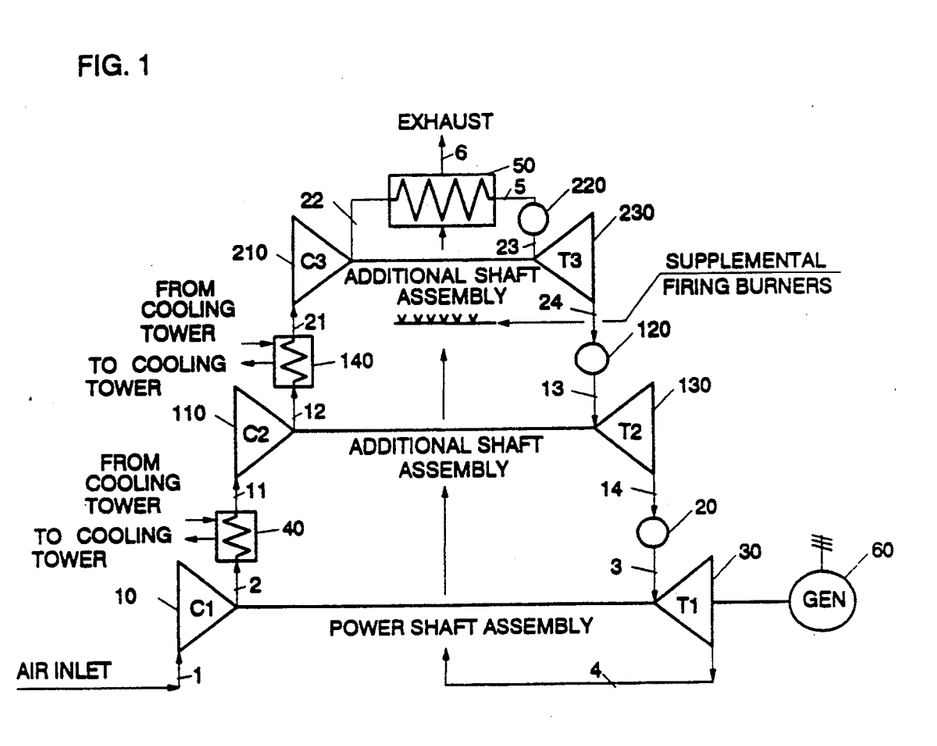
FIG. 1 is a schematic diagram of a first illustrative embodiment of an electric power generating system according to the present invention.
Figure 2:
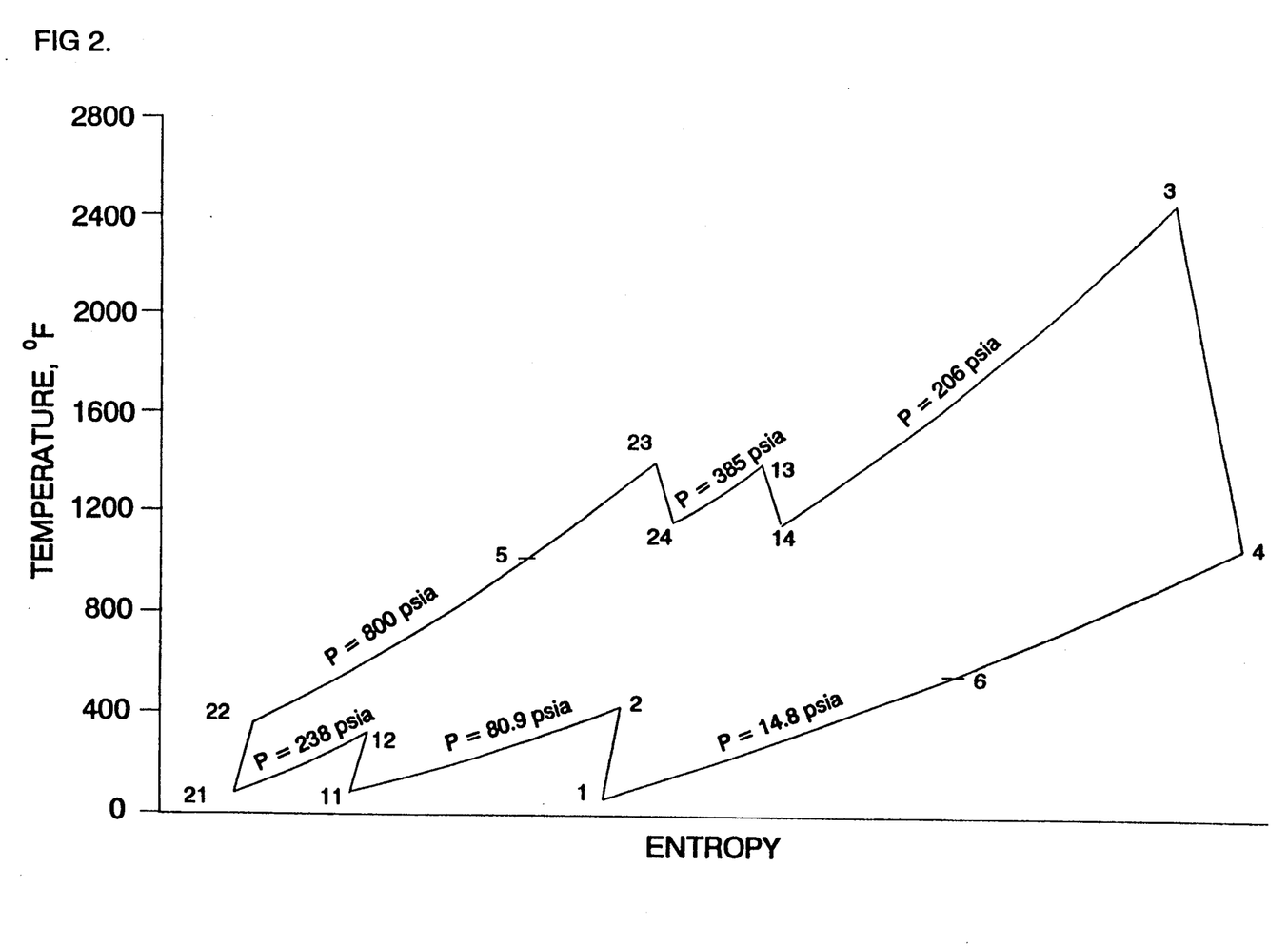
FIG. 2 is a temperature-entropy diagram for the system of FIG. 1.

The major theoretical and conceptual features of the invention are set forth in the new combustion turbine thermal cycle shown in FIG. 2 on a temperature-entropy diagram and schematic diagrams FIGS. 1, 3, 4 and 5.

The foregoing, and additional, objects are attained in accordance with the principles of this invention by providing a method of providing power with an electric power generating system including a generator, a single power shaft assembly having a compressor, an expansion turbine, a combustor feeding the expansion turbine, and structure for coupling the expansion turbine to drive the compressor and the electric generator. The method includes the steps of providing at least one additional shaft assembly including at least one combination of a compressor and an intercooler feeding the compressor thereof, at least one combination of an expansion turbine and a combustor feeding the expansion turbine thereof, and structure for coupling at least one expansion turbine of the at least one additional shaft assembly to drive the at least one compressor of the at least one additional shaft assembly; providing a heat recuperator; connecting the single power shaft assembly, the at least one additional shaft assembly, and the recuperator so as to define a thermal cycle with an air and gas path that passes through the compressor of the single power shaft assembly, through the intercooler and compressor of the at least one additional shaft assembly, through the heat recuperator, through the combustor and expansion turbine of the at least one additional shaft assembly, and through the combustor and expansion turbine of the single power shaft assembly; ensuring that a total compression pressure ratio of all compressors of the at least one additional shaft assembly is greater than a total expansion pressure ratio of all expansion turbines of the at least one additional shaft assembly; and ensuring that the compressor of the single power shaft assembly has a compressor pressure ratio lower than an expansion pressure ratio of the expansion turbine of the single power shaft assembly, thereby pressure unloading the compressor of the single power shaft assembly so that the expansion turbine of the single power shaft assembly supplies more of its power to the electric generator.

The major original features of the inventive gas turbine concept and method are as follows (see FIG. 2):

The inlet temperature to the highest pressure turbine (FIG. 2, point 23), of the plurality of the additional shaft assemblies, has the lowest inlet temperature at the level of current industrial expander technology (1400° F. to 1600° F.). The other turbines (point 13) of the additional shaft assemblies (except the lowest pressure turbine), have approximately the same inlet temperature, or only slightly higher (potentially increasing with reduced inlet pressure). The highest inlet temperature is at the inlet to the lowest pressure turbine (point 3) of the power shaft assembly and presents the current state of the art temperature level for combustion turbines (2300° F. to 2500° F.). This distribution of turbine inlet temperatures is in contrast with the prior art theoretical cycle as disclosed in U.S. Pat. No. 2,584,232 and provides very high thermal cycle efficiency, making practical engineering sense. It addresses the first engineering problem of the prior art: a prohibitive coincidental high pressure and temperature at the high pressure turbine inlet.

Consequently, the reduced inlet temperatures of the high and intermediate pressure turbines (of the additional shaft assemblies), reduce the inlet temperatures to the downstream combustors. This addresses the second engineering problem of the prior art cycle.

The optimized distribution of the expansion pressure ratio among a plurality of turbines results in approximately equal pressure ratios for all turbines (of the additional shaft assemblies), except for the lowest pressure turbine (of the power shaft assembly). The lowest pressure turbine has the highest pressure ratio, corresponding to that of a simple cycle combustion turbine, which components are utilized for the power shaft assembly. This allows the modification of an existing combustion turbine into the inventive concept—the major thrust of this invention.

The optimized distribution of the overall compression pressure ratio among compressors is dictated by considerations of the balanced high and intermediate pressure shafts (of the additional shaft assemblies) and is different from the equal distribution for the prior art cycle.

The recuperator recovers the high temperature exhaust gas heat from the power shaft assembly turbine to preheat the air prior to entering the highest pressure combustor of the additional shaft assemblies.

In accordance with a major aspect of this invention, a new combustion turbine thermal cycle has been developed with major parameters and other features different from the prior art. The resulting cycle has a significantly higher efficiency as compared to the state-of-the art combustion turbine. This thermal cycle simultaneously resolves major engineering problems thus ensuring its practical implementation.

In accordance with another aspect of this invention, in each of the additional shaft assemblies, the compression pressure ratio of the compressors is greater than the expansion pressure ratio of the expansion turbines. Therefore, for total pressure balance the compression pressure ratio of the power shaft assembly compressor is less than the expansion pressure ratio of the power shaft assembly expansion turbine. In effect, the compressor of the power shaft assembly is partially unloaded so that the expansion turbine of the power shaft assembly can supply more of its power to the electric generator.

In accordance with a further aspect of this invention, exhaust gas from the power shaft assembly expansion turbine is directed to the heat recuperator so as to provide a heat source therefor.

In accordance with yet a further aspect of this invention, the multi-shaft arrangement (power shaft and at least one additional shaft assembly) provides for convenient and economical location of inter-coolers. This allows an increase in the pressure ratio of compressors of the power balanced additional shaft assemblies, thus further unloading the compressor of the power shaft assembly, which, in turn, provides additional power for electric power generation and increases efficiency.

In accordance with still yet a further aspect of this invention, the saturator saturates the compressed air, thus further reducing the air requirements per kilowatt-hour produced with associated reduction of power consumption by the compressors of the additional shaft assemblies and by the compressor of the power shaft assembly.

Further yet, in accordance with a further aspect of this invention, hot water required for the compressed air saturation in the saturator is produced in water heaters (recovering the heat available in the exhaust gas leaving the power shaft assembly turbine after partial heat recovery in the recuperator) and in the intercoolers and aftercooler (recovering the compressed air heat).

Still further yet, in accordance with a further aspect of this invention, the steam generated in the heat recovery steam generator produces additional power via steam injection or in the bottoming cycle.

Still further yet, in accordance with a further aspect of this invention, a chemical fuel recuperator/reformer is used which reforms a mixture of methane-rich fuel and steam into hydrogen-enriched fuel and steam mixture, thus increasing the system efficiency and reducing pollutant emissions.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION OF THE INVENTION

FIG. 1 is a schematic representation of a first illustrative embodiment of an electric power generating system according to this invention. The power shaft assembly represents a conventional heavy duty combustion turbine or an aircraft derivative combustion turbine which includes the compressor 10, the expansion turbine 30, the combustor 20 which feeds heated combustion product gas to the expansion turbine 30, the expansion turbine 30 being coupled to drive the compressor 10 and the electric generator 60. In a standard application, air which enters the low pressure compressor 10 at its inlet 1 is compressed thereby and provided at its outlet 2. The compressed air is discharged directly to the low pressure combustor 20 and then expanded through the low pressure expansion turbine 30. In the conventional arrangement, the power output of the turbine 30 is substantially equally divided for driving the compressor 10 and the generator 60.

In accordance with this invention, at least one additional shaft assembly is provided to modify the conventional power shaft assembly described above. Illustratively, two additional shaft assemblies are shown. Also, a heat recuperator 50 is provided. It is within the contemplation of the invention that the heat recuperator may be a chemical recuperator, which will be discussed below. Thus, the first additional shaft assembly includes the intercooler 40, the intermediate pressure compressor 110, the intermediate pressure combustor 120 and the intermediate pressure expansion turbine 130. The second additional shaft assembly includes the high pressure intercooler 140, the high pressure compressor 210, the high pressure combustor 220 and the high pressure expansion turbine 230. The intercoolers 40 and 140 are cooled by water supplied from a cooling tower or other water sources (lakes, rivers, etc.).

As shown, the air and gas path extends through the modified compressor of the conventional power shaft assembly, through the intercoolers and compressors of the additional shaft assemblies, through the recuperator, through the combustors and expansion turbines of the additional shaft assemblies, and then through the combustor and expansion turbine of the conventional power shaft assembly. Thus, the exhaust 2 of the low pressure compressor 10 passes through the intercooler 40 which reduces its temperature at the inlet 11 of the intermediate compressor 110. The pressure of the air is then again raised and provided at the exhaust 12 of the compressor 110 to the intercooler 140 which lowers its temperature and provides the cooled intermediate pressure air at the inlet 21 to the high pressure compressor 210. The exhaust 22 of the high pressure compressor 210 is provided as an input to the heat recuperator 50. The outlet 5 of the heat recuperator 50 is connected to the high pressure combustor 220, whose outlet 23 is provided to the high pressure expansion turbine 230. The exhaust 24 of the high pressure expansion turbine 230 is heated in the intermediate pressure combustor 120 and then provided to the inlet 13 of the intermediate pressure expansion turbine 130. The exhaust 14 of the intermediate pressure expansion turbine 130 is heated in the low pressure combustor 20 and then provided to the inlet 3 of the low pressure expansion turbine 30, the exhaust 4 of which is utilized as a heat source for the heat recuperator 50, before going to the system exhaust 6. The thermodynamic cycle is shown as the temperature-entropy diagram of FIG. 2.

Based on practical manufacturing considerations, it is within the contemplation of the invention to combine the additional shaft assemblies into a single additional shaft assembly including at least one combination of a compressor and an intercooler feeding the compressor, and at least one combination of an expansion turbine and a combustor feeding the expansion turbine. For example, the single additional shaft assembly can be configured to include two compressors with associated intercoolers, and one expander with an associated combustor. Various other configurations are possible depending on cost and sizing considerations.

Conventionally, when a simple cycle power shaft assembly is utilized, the compression pressure ratio of the compressor equals the expansion pressure ratio of the turbine, and the output combustion turbine power from the turbine is substantially equally divided for driving the compressor and the electric generator. However, according to the present invention, the compression pressure ratio of compressor 10 is substantially reduced so that turbine 30 can supply more of its power for driving generator 60. This lowering of the compression pressure ratio of the compressor 10 is accompanied by raising the overall compression pressure ratio of the additional shaft assemblies over the overall expansion pressure ratio of the additional shaft assemblies expansion turbines. By introducing the intercoolers 40 and 140, the temperature of the air entering the compressors 110 and 210 is reduced, which reduces the power consumed by the compressors 110 and 210, and for the same power consumption by the compressors allows for increased compression pressure ratios.

Figure 3:
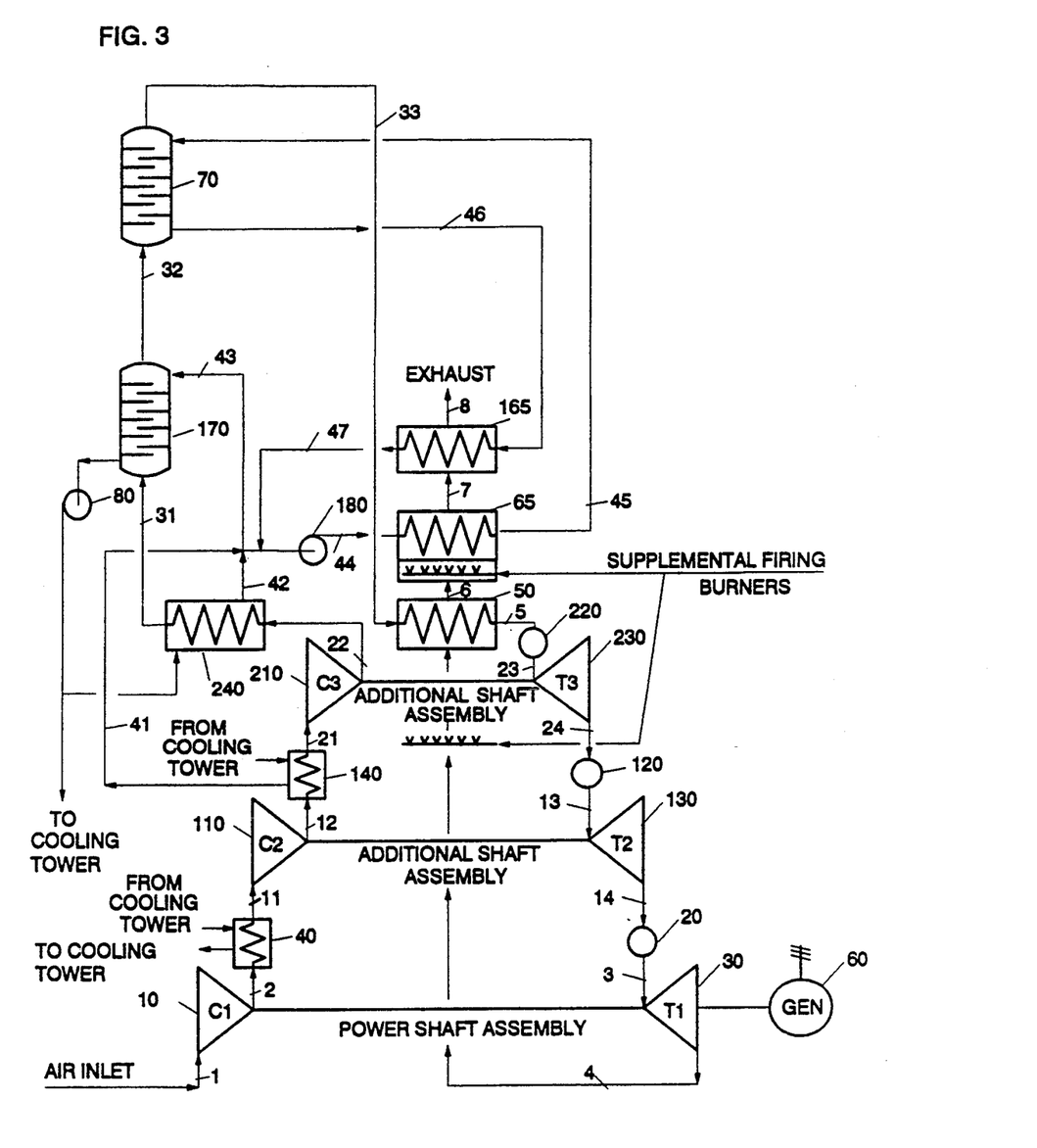
FIG. 3 is a schematic diagram of a second illustrative embodiment of an electric power generating system according to the present invention.

FIG. 3 illustrates a modification to the system shown in FIG. 1 which further includes an aftercooler 240 and air saturators 170 and 70 connected between the output of the high pressure compressor 210 and the inlet of the heat recuperator 50. Thus, from the outlet 22 of the high pressure compressor 210, the compressed air is cooled in the aftercooler 240 and then directed into the inlet 31 of the saturator 170 and into the inlet 32 of the saturator 70, where the compressed air is saturated with water and preheated before entering the inlet 33 of the heat recuperator 50. The remainder of the air and gas path is identical to that of FIG. 1. The saturators 170 and 70 are fed by water which has been heated in intercooler 140 and aftercooler 240, and the exhaust gas heat recovering water heaters 65 and 165. The water flow paths, including the pumps 80 and 180, are readily apparent from FIG. 3. If desired, the recuperator 50 and the water heater 65 can be supplementally fired by the installation of duct burners.

The system shown in FIG. 3 has been shown to have a significantly higher efficiency (up to approximately 53% with state of the art combustion turbines) over the basic system shown in FIG. 1 (approximately 47% efficiency), but the increased efficiency has some penalties. Thus, the system shown in FIG. 3 requires a significant amount of make-up water and therefore may have some sizing limitations. Further, the system shown in FIG. 3 with saturators is more complicated when compared with the basic system shown in FIG. 1, although it is significantly simpler in engineering and operation as compared to a combined cycle plant with a comparable efficiency. The specific capital cost, in dollars per kilowatt, for the system of FIG. 3 is only slightly higher than the cost of a simple cycle gas turbine.

Figure 4:
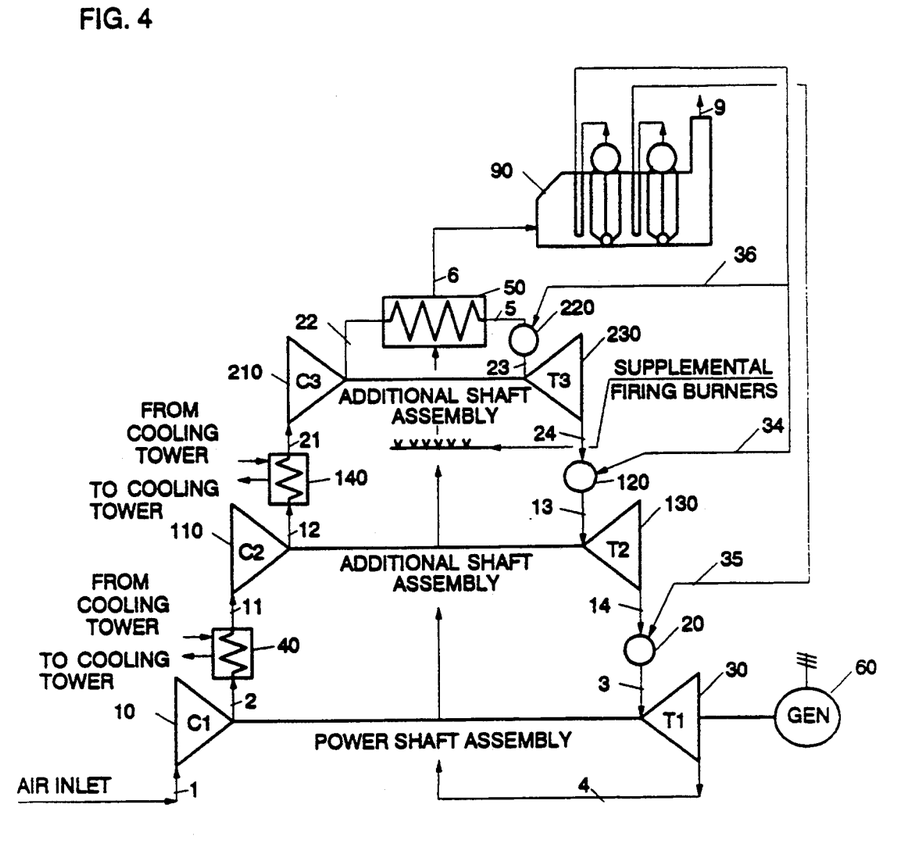
FIG. 4 is a schematic diagram of a third illustrative embodiment of an electric power generating system according to the present invention.

FIG. 4 illustrates another modification to the system of FIG. 1 wherein the exhaust 6 from the heat recuperator 50 is directed to the heat recovery steam generator 90 to produce steam which may be injected into one or more of the combustors 20, 120 and 220 and/or expansion turbines 30, 130 and 230. The remainder of the system is the same as that shown in FIG. 1.

Figure 5:
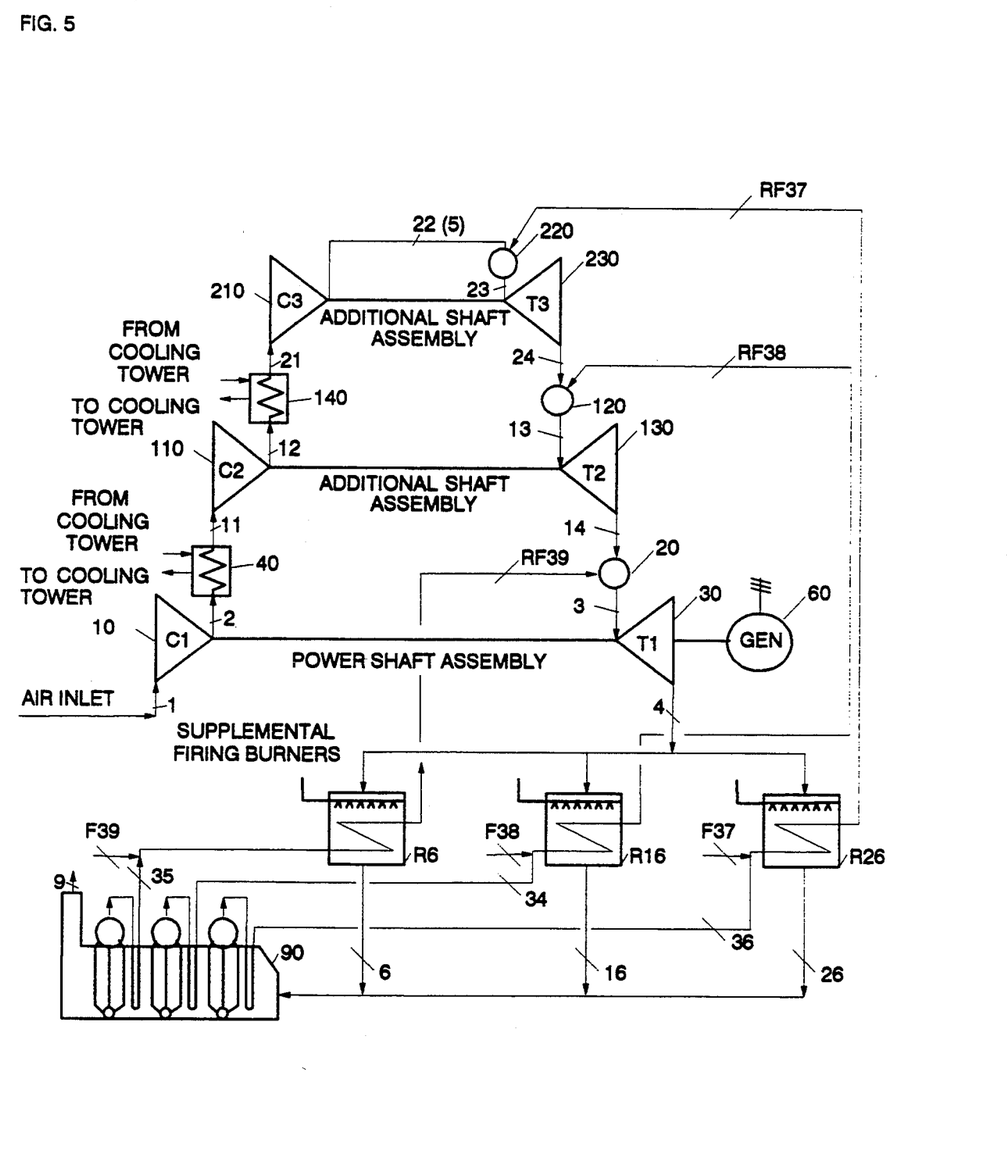
FIG. 5 is a schematic diagram of a fourth illustrative embodiment of an electric power generating system according to the present invention.

FIG. 5 illustrates still another modification to the system of FIG. 1 which includes at least one chemical fuel recuperator/reformer and heat recovery steam generator. The power shaft assembly expander's outlet 4 is directed into three parallel chemical recuperators/reformers R6, R16 and R26 to reform at high temperature a mixture of natural gas flows F39, F38 and F37 (mostly methane) and steam flows 34, 35 and 36 into hydrogen rich reformed fuel flows RF37, RF38 and RF39. The chemical recuperator/reformer outlets 6, 16, and 26 are directed into the multi-pressure heat recovery steam generator 90 and then to the stack. The air and gas flow paths are similar to those of FIG. 1 except for the fact outlet 22 of the high pressure compressor 210 is directed to the inlet 5 to the high pressure combustor 220 (no air preheating in the recuperator). The reformed fuel is very efficiently burned in combustors with significantly reduced NOx emissions. The system shown in FIG. 5 has been shown to have efficiency of approximately 50%–52% with the current level of the cycle parameters. The system of FIG. 5 has a number of potentially attractive configurations including one where the recuperator/reformer utilizes the exhaust heat of at least one of the expanders of the additional shaft assemblies.

Thus, the inventive combustion turbine system is a multi-shaft combustion turbine system with a sophisticated thermodynamic cycle and significantly higher efficiency as compared to the state of the art combustion turbine with an estimated specific capital cost, in dollars per kilowatt hour, comparable to that of a simple cycle combustion turbine system. The inventive system resolves major engineering problems which until now have prevented an implementation of these sophisticated concepts. The system utilizes commercially available components and can be delivered skid mounted, thus shortening the construction time and reducing field construction and cost.

The following TABLE 1 presents performance and key point parameters for the inventive system, which are compared to those for a simple cycle combustion turbine.

TABLE 1

| | | GAS TURBINE MODEL | | | | |
|---|---|---|---|---|---|---|
| | W501F SIMPLE GAS TURBINE | MODIFIED W501F GAS TURBINE W/RECUPERATOR | TWO SHAFT INTERCOOLED REHEAT GAS TURBINE W/RECUPERATOR | THREE SHAFT INTERCOOLED REHEAT GAS TURBINE W/RECUPERATOR (FIG. 1) | THREE SHAFT INTERCOOLED REHEAT GAS TURBINE W/RECUPERATOR & SATURATORS (FIG. 3) | THREE SHAFT INTERCOOLED REHEAT GAS TURBINE W/RECUPERATOR & STEAM INJECTION (FIG. 4) |
| PERFORMANCE DATA | | | | | | |
| GROSS POWER, MW | 154.5 | 149.6 | 196.4 | 223.8 | 261 | 239.8 |
| GROSS HEAT RATE, BTU/KWH | 9,330 | 8,276 | 7,826 | 7,454 | 6,460 | 7,029 |
| OVERALL PRESSURE RATIO | 14.0 | 14.7 | 34.0 | 54.4 | 54.4 | 54.4 |
| GROSS EFFICIENCY, % | 36.6 | 41.2 | 43.6 | 45.8 | 52.8 | 48.5 |
| MAJOR CYCLE PARAMETERS AT KEY CYCLE POINTS | | | | | | |

| STATE POINTS | PARAMETRS | | | | | | |
|---|---|---|---|---|---|---|---|
| 1 | PRESSURE, PSIA | 14.7 | 14.7 | 14.7 | 14.7 | 14.7 | 14.7 |
| | TEMPERATURE, °F. | 59 | 59 | 59 | 59 | 59 | 59 |
| | INLET AIR FLOW, LB/SEC | 943 | 949 | 942 | 941 | 770 | 826 |
| 2 | PRESSURE, PSIA | 206 | 216 | 120.1 | 80.9 | 54.3 | 72.62 |
| | TEMPERATURE, °F. | 714 | 731 | 539 | 426 | 324 | 397 |
| 3 | PRESSURE, PSIA | 195.5 | 195.5 | 195.5 | 195.5 | 195.5 | 195.5 |
| | TEMPERATURE, °F. | 2462 | 2462 | 2462 | 2462 | 2458 | 2462 |
| 4 | PRESSURE, PSIA | 14.8 | 15.1 | 15.1 | 15.1 | 15.1 | 15.1 |
| | TEMPERATURE, °F. | 1074 | 1069 | 1069 | 1070 | 1130 | 1117 |

TABLE 1-continued

| | | W501F SIMPLE GAS TURBINE | MODIFIED W501F GAS TURBINE W/RECUPERATOR | TWO SHAFT INTERCOOLED REHEAT GAS TURBINE W/RECUPERATOR | THREE SHAFT INTERCOOLED REHEAT GAS TURBINE W/RECUPERATOR (FIG. 1) | THREE SHAFT INTERCOOLED REHEAT GAS TURBINE W/RECUPERATOR & SATURATORS (FIG. 3) | THREE SHAFT INTERCOOLED REHEAT GAS TURBINE W/RECUPERATOR & STEAM INJECTION (FIG. 4) |
|---|---|---|---|---|---|---|---|
| | EXHAUST FLOW, LB/SEC* | 962 | 965 | 958 | 958 | 878 | 900 |
| 5 | PRESSURE, PSIA | N/A | 216 | 485 | 785 | 772 | 785 |
| | TEMPERATURE, °F. | | 1018 | 1018 | 1018 | 1072 | 1061 |
| 6 | PRESSURE, PSIA | N/A | 14.7 | 14.7 | 14.7 | 14.9 | 14.9 |
| | TEMPERATURE, °F. | | 855 | 602 | 564 | 546 | 644 |
| 11 | PRESSURE, PSIA | N/A | N/A | 116 | 78.1 | 52.4 | 70.1 |
| | TEMPERATURE, °F. | | | 80 | 80 | 80 | 80 |
| 12 | PRESSURE, PSIA | N/A | N/A | 500 | 244.5 | 200.8 | 249 |
| | TEMPERATURE, °F. | | | 412 | 318 | 369 | 350 |
| 13 | PRESSURE, PSIA | N/A | N/A | 465.5 | 384.5 | 382 | 387 |
| | TEMPERATURE, °F. | | | 1400 | 1400 | 1400 | 1400 |
| 14 | PRESSURE, PSIA | N/A | N/A | 206 | 206 | 206 | 206 |
| | TEMPERATURE, °F. | | | 1095 | 1163 | 1174 | 1164 |
| 21 | PRESSURE, PSIA | N/A | N/A | N/A | 238 | 195.7 | 242.9 |
| | TEMPERATURE, °F. | | | | 80 | 80 | 80 |
| 22 | PRESSURE, PSIA | N/A | N/A | N/A | 800 | 800 | 800 |
| | TEMPERATURE, °F. | | | | 354 | 410 | 350 |
| 23 | PRESSURE, PSIA | N/A | N/A | N/A | 747 | 734.3 | 770 |
| | TEMPERATURE, °F. | | | | 1400 | 1400 | 1400 |
| 24 | PRESSURE, PSIA | N/A | N/A | N/A | 400 | 398 | 403.6 |
| | TEMPERATURE, °F. | | | | 1162 | 1174 | 1164 |
| 8/9 | PRESSURE, PSIA | N/A | N/A | N/A | N/A | 14.7 | 14.7 |
| | TEMPERATURE, °F. | | | | | 319 | 362 |
| 31 | PRESSURE, PSIA | N/A | N/A | N/A | N/A | 788 | N/A |
| | TEMPERATURE, °F. | | | | | 280 | |
| 33 | PRESSURE, PSIA | N/A | N/A | N/A | N/A | 787 | N/A |
| | TEMPERATURE, °F. | | | | | 345 | |
| | MASS % OF MOISTURE IN MOIST AIR | | | | | 12.6 | |
| 34 | HP STEAM | N/A | N/A | N/A | N/A | N/A | |
| | PRESSURE, PSIA | | | | | | 450 |
| | TEMPERATURE, °F. | | | | | | 610 |
| | MASS FLOW, LB/SEC | | | | | | 47.9 |
| 35 | LP STEAM | N/A | N/A | N/A | N/A | N/A | |
| | PRESSURE, PSIA | | | | | | 300 |
| | TEMPERATURE, °F. | | | | | | 440 |
| | MASS FLOW, LB/SEC | | | | | | 7.8 |

NOTE: *Includes Air, Moisture and Fuel

It should be noted that the performance characteristics presented in TABLE 1 are based on the current level of technology development and on the performance characteristics of Westinghouse's W501F combustion turbine as the source of the power shaft assembly components and the performance characteristics of commercial turbo-expanders and compressors for the additional shaft assemblies. For example, the power shaft assembly turbine 30 inlet temperature is assumed to be $T_3 = 2462°$ F. (FIG. 2), corresponding to the current level of inlet temperatures for advanced simple cycle combustion turbines. Also, the inlet temperature to the expansion turbines 230 and 130 is assumed to be $T_{23} = T_{13} = 1400°$ F., which is relatively low and corresponds to the current inlet temperature of available industrial expansion turbines. Increasing the inlet temperature of the turbines 230 and 130 from 1400° F. to 1600° F. (a practical next level) will increase the efficiency of the inventive system by approximately absolute 3% (45.8% efficiency will become 48.8% efficiency). It is noted that any advanced developments in combustion turbine technology are fully applicable to the inventive system.

TABLE 1 shows the advantages of other embodiments of the inventive concepts. Thus, the second embodiment (FIG. 3), with the addition of a saturator, associated aftercooler and waste heat water heaters, has a gross efficiency of 52.8%, as compared to an efficiency of 36.6% for the state of the art combustion turbine. TABLE 1 also shows that the third embodiment (FIG. 4) of the inventive concept with use of the heat recovery steam generator shows an efficiency of 48.5%.

The major attractiveness of the described system is in its originality, effectiveness and what is most important, simplicity of implementation. The power shaft assembly is a standard commercially available combustion turbine. The modifications required are relatively minor. First, the low pressure compressor 10 pressure ratio has to be reduced to below the pressure ratio of its associated expansion turbine. The power-balanced additional shaft assemblies have compression pressure ratios of compressors 110 and 210 which are higher than the corresponding expansion pressure ratios of the turbines 230 and 130. For the same overall compression pressure ratio, this in turn reduces the required compression pressure ratio for the low pressure compressor 10. Then, the generator 60 is upgraded for the higher power generating capacity of the plant. Also, the power shaft assembly is thrust balanced either by upgrading the existing thrust bearing or by the addition of an external thrust bearing connected to the power shaft assembly. The easiest way of reducing the pressure ratio of the compressor 10 is by de-blading a number of its last stages, which can be performed by a manufacturer or by any packager or any utility. The additional shaft assemblies can be supplied by industrial turbo-driven compressor manufacturers, supported by combustor manufacturers. The described multi-shaft combustion turbine can be commercially offered by combustion turbine manufacturers, industrial steam turbine and turbo machinery manufacturers and/or by other packagers. The system described herein is applicable to all alternative modifications of combustion turbines.

Accordingly, there has been disclosed an improved electric power generating system. While illustrative embodiments of the present invention have been disclosed herein, it is understood that various modifications and adaptations to the disclosed embodiments will be apparent to those of ordinary skill in the art and it is only intended that this invention be limited by the scope of the appended claims.

What is claimed is:

1. A method of efficiently providing power with an electric power generating system, the generating system including a generator, a single power shaft assembly having a compressor, an expansion turbine, a combustor feeding said expansion turbine, and structure for coupling said expansion turbine to drive said compressor and the electric generator, the method including the steps of:

providing at least one additional shaft assembly including at least one combination of a compressor and an intercooler feeding cooled air to said compressor thereof, at least one combination of an expansion turbine and a combustor feeding said expansion turbine thereof, and means for coupling at least one expansion turbine of said at least one additional shaft assembly to drive at least one compressor of said at least one additional shaft assembly;

providing a heat recuperator;

connecting said single power shaft assembly, said at least one additional shaft assembly, and said recuperator so as to define a thermal cycle with an air and gas path that passes through the compressor of said single power shaft assembly, through the at least one intercooler and compressor combination of said at least one additional shaft assembly, through the heat recuperator, through the at least one combustor and expansion turbine combination of said at least one additional shaft assembly, through the combustor and expansion turbine of said single power shaft assembly, and through the recuperator and to an exhaust;

ensuring that a total compression pressure ratio of all compressors of the at least one additional shaft assembly is greater than a total expansion pressure ratio of all expansion turbines of the at least one additional shaft assembly; and ensuring that said compressor of the single power shaft assembly has a compressor pressure ratio lower than an expansion pressure ratio of the expansion turbine of said single power shaft assembly, thereby pressure unloading said compressor of said single power shaft assembly so that said expansion turbine of said single power shaft assembly supplies more of its power to the electric generator.

2. The method according to claim 1 wherein the step of providing the single power shaft assembly compressor includes the step of removing blades of at least one stage of the single power shaft assembly compressor.

3. The method according to claim 1 further including the step of directing exhaust gas from the single power shaft assembly expansion turbine to provide a heat source for the heat recuperator.

4. The method according to claim 1, wherein two additional shaft assemblies are provided, and the connecting step includes connecting said single power shaft assembly, a first additional shaft assembly, a second additional shaft assembly and said recuperator so as to define a thermal cycle with an air and gas path that passes through the compressor of said single power shaft assembly, through the at least one intercooler and compressor combination of said first additional shaft assembly, through the at least one intercooler and compressor combination of said second additional shaft assembly, through the heat recuperator, through the at least one combustor and expansion turbine combination of said second additional shaft assembly, through the at least one combustor and expansion turbine combination of said first additional shaft assembly, through the combustor and expansion turbine of said single power shaft assembly and through the recuperator and to an exhaust so as to pressure unload said compressor of said single power shaft assembly.

5. The method according to claim 1 further including the steps of:

providing an air saturator; and connecting said air saturator between said heat recuperator and the highest pressure compressor of the at least one additional shaft assembly so that compressed air leaving the highest pressure compressor of the at least one additional shaft assembly is saturated with water before entering the heat recuperator.

6. The method according to claim 5 further including the step of heating the water provided to said air saturator.

7. The method according to claim 6 further including the steps of:

providing an aftercooler; and connecting said aftercooler between said air saturator and the highest pressure compressor of the at least one additional shaft assembly for heating the water prior to entering the air saturator.

8. The method according to claim 7 wherein the heating step utilizes heat extracted from the single power shaft assembly expansion turbine exhaust, outlet gas from at least one expansion turbine of the at least one additional shaft assembly, the intercoolers and the aftercooler.

9. The method according to claim 1 further including the step of directing exhaust from the heat recuperator to a steam generator to produce steam which is injected into at least one of the combustors of the at least one additional shaft assembly and the combustor of the single power shaft assembly.

10. The method according to claim 1 further including the step of directing exhaust from the heat recuperator to a steam generator to produce steam which is injected into at least one of the combustors and at least one of the expansion turbines of the at least one additional shaft assembly and the combustor and expansion turbine of the single power shaft assembly.

11. The method according to claim 1 wherein the step of providing a heat recuperator includes providing a chemical recuperator.

12. The method according to claim 11 wherein the step of providing a chemical recuperator includes directing outlet gas from the expander of the single power shaft assembly into the chemical recuperator for reforming a mixture of natural gas flows and steam flows into hydrogen enriched reformed fuel flows which are injected into at least one of the combustors of the system; outlet gas of the chemical recuperator being directed to a heat recovery steam generator.

13. The method according to claim 12 wherein the step of providing a chemical recuperator includes providing a plurality of parallel chemical recuperators.

14. A method of efficiently providing power with an electric power generating system, the generating system including a generator, a single power shaft assembly having a compressor, an expansion turbine, a combustor feeding the expansion turbine, and coupling structure for coupling the expansion turbine to drive the compressor and the electric generator, the method including the steps of:

providing at least one additional shaft assembly for the generating system including at least one combination of a compressor and a intercooler feeding cooled air to the compressor thereof, at least one combination of an expansion turbine and a combustor feeding the expansion turbine thereof, and structure for coupling at least one expansion turbine of the additional shaft assembly to drive at least one compressor of the at least one additional shaft assembly, providing a heat recuperator;

connecting the single power shaft assembly, the at least one additional shaft assembly, and the recuperator so as to define a thermal cycle with an air and gas path that passes through the compressor of the single power shaft assembly, through the at least one intercooler and compressor combination of the at least one additional shaft assembly, through the heat recuperator, through the at least one combustor and expansion turbine combination of the at least one additional shaft assembly, through the combustor and expansion turbine of the single power shaft assembly, and through the recuperator and to an exhaust;

ensuring that an inlet temperature of the highest pressure turbine of the additional shaft assemblies is the lowest inlet temperature of all the turbines in the system;

ensuring that all of the turbines of each additional shaft assembly have substantially equal inlet temperatures;

ensuring that an inlet temperature of the turbine of said single power shaft assembly is the highest inlet temperature of all the turbines in the system;

ensuring that expansion pressure ratios of the turbines in the system are distributed substantially equally among the turbines of the additional shaft assemblies with the highest expansion pressure ratio of the system being allocated to the turbine of said single power shaft assembly;

ensuring that an overall compression pressure ratio of the compressors in the system is distributed among the compressors of each additional shaft assembly to achieve power balance of each additional shaft assembly with the remaining compression pressure ratio being allocated to the compressor of said single power shaft assembly, thereby pressure unloading the compressor of the single power shaft assembly so that said expansion turbine of said single power shaft assembly supplies more of its power to the electric generator.

* * * * *